United States Patent [19]

Ito et al.

[11] Patent Number: 4,594,916
[45] Date of Patent: Jun. 17, 1986

[54] METHOD FOR CONTROLLING AN ENGINE INSTALLED WITH CONTINUOUSLY VARIABLE TRANSMISSION

[75] Inventors: Hiroshi Ito, Toyota; Shigeki Hiramatsu, Okazaki; Mitsuru Takada, Toyota, all of Japan

[73] Assignee: Toyota Jidosha Kabushiki Kaisha, Aichi, Japan

[21] Appl. No.: 574,737

[22] Filed: Jan. 30, 1984

[30] Foreign Application Priority Data

Feb. 7, 1983 [JP] Japan .................................. 58-17550

[51] Int. Cl.⁴ .............................................. B60K 41/16
[52] U.S. Cl. .......................................... 74/866; 74/867; 474/12; 474/70
[58] Field of Search ....................... 123/480, 488, 492; 74/866, 867, 865; 474/12, 69, 70

[56] References Cited

U.S. PATENT DOCUMENTS

| | | | |
|---|---|---|---|
| 3,036,426 | 5/1962 | Brueder | 60/12 |
| 3,362,262 | 1/1968 | Brueder | 74/868 |
| 3,814,224 | 6/1974 | Podssuweit et al. | 192/0.084 |
| 3,913,418 | 10/1975 | Miyao et al. | 74/865 X |
| 4,091,690 | 5/1978 | Miyao | 74/865 |
| 4,462,275 | 7/1984 | Mohl et al. | 74/866 |

FOREIGN PATENT DOCUMENTS

| | | |
|---|---|---|
| 2239874 | 3/1973 | Fed. Rep. of Germany . |
| 1277825 | 6/1972 | United Kingdom . |
| 2066919 | 7/1981 | United Kingdom . |

*Primary Examiner*—Rodney H. Bonck
*Assistant Examiner*—Richard M. Lorence
*Attorney, Agent, or Firm*—Parkhurst & Oliff

[57] ABSTRACT

A method is provided for controlling an engine using a continuously variable transmission whereby the fuel consumption of the engine is decreased. When an accelerator of the engine is displaced, first and second desired engine speeds are determined for steady state conditions before and after the displacement of the accelerator, respectively. The difference between the two desired engine speeds is calculated and compared with a predetermined value. If the difference between the desired engine speeds is smaller than the predetermined value, the actual engine speed is adjusted to gradually approach the second desired engine speed. If the difference between the two desired engine speeds is larger than the predetermined value, the actual engine speed is immediately adjusted to a transient value and is then adjusted to approach the new desired engine speed gradually.

16 Claims, 9 Drawing Figures

METHOD FOR CONTROLLING AN ENGINE INSTALLED WITH CONTINUOUSLY VARIABLE TRANSMISSION

BACKGROUND OF THE INVENTION

The present invention relates to a method for controlling an engine installed with a continuously variable transmission (hereinafter referred to as CVT), and more particularly to a method for controlling the speed of the engine during a transient shifting period.

A continuously variable transmission having a V-belt extending between driving and driven pulleys, with one or both of the pulleys being able to adjust the size of their respective V-shaped openings which hold the V-belt, thereby controlling the revolution ratio between the driving and driven pulleys. The size of the V-shaped opening is varied by changing the amount of pressure being fed into a hydraulic cylinder of either of the pulleys. Hence, the effective diameter of the pulley can be varied by changing the amount of pressure being fed into the hydraulic cylinder, thereby allowing for a continuously varying ratio of driving pulley effective diameter to driven effective pulley diameter. The V-shaped openings on the driving and driven pulleys are each defined by an area between a fixed portion of the pulley and a movable portion of the pulley, the size of the V-shaped opening being dependent upon the pressure inputted to the hydraulic cylinders. In order to provide hydraulic pressure to each of the movable pulleys, a hydraulic apparatus is provided.

A prior hydraulic apparatus was designed in a manner which provided for the engine rpm to be a function of the amount of throttle opening while maintaining a minimum fuel consumption. When an operator applied a force to an accelerator pedal, the engine speed was immediately increased. This fact generally resulted in an increase in the fuel consumption by the engine during a transient shifting period.

SUMMARY OF THE INVENTION

The present invention was made in view of the foregoing background and to overcome the foregoing drawbacks. An object of the present invention is to provide a method for controlling an engine having a CVT so that the fuel consumption of an engine is decreased during a transient shifting condition.

To attain the above object, a change in the amount of throttle opening is first detected. Then, an estimated engine rpm under a steady state, non-shifting condition is determined as a function of the actual amount of throttle opening, to obtain a minimum fuel consumption. Next, a comparison is made between the engine rpm at the point of just opening the throttle and the estimated steady state rpm corresponding to the actual amount of the throttle opening. The engine rpm is controlled in accordance with the magnitude of the difference between the actual and estimated rpm's.

BRIEF DESCRIPTION OF THE DRAWINGS

The above object, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
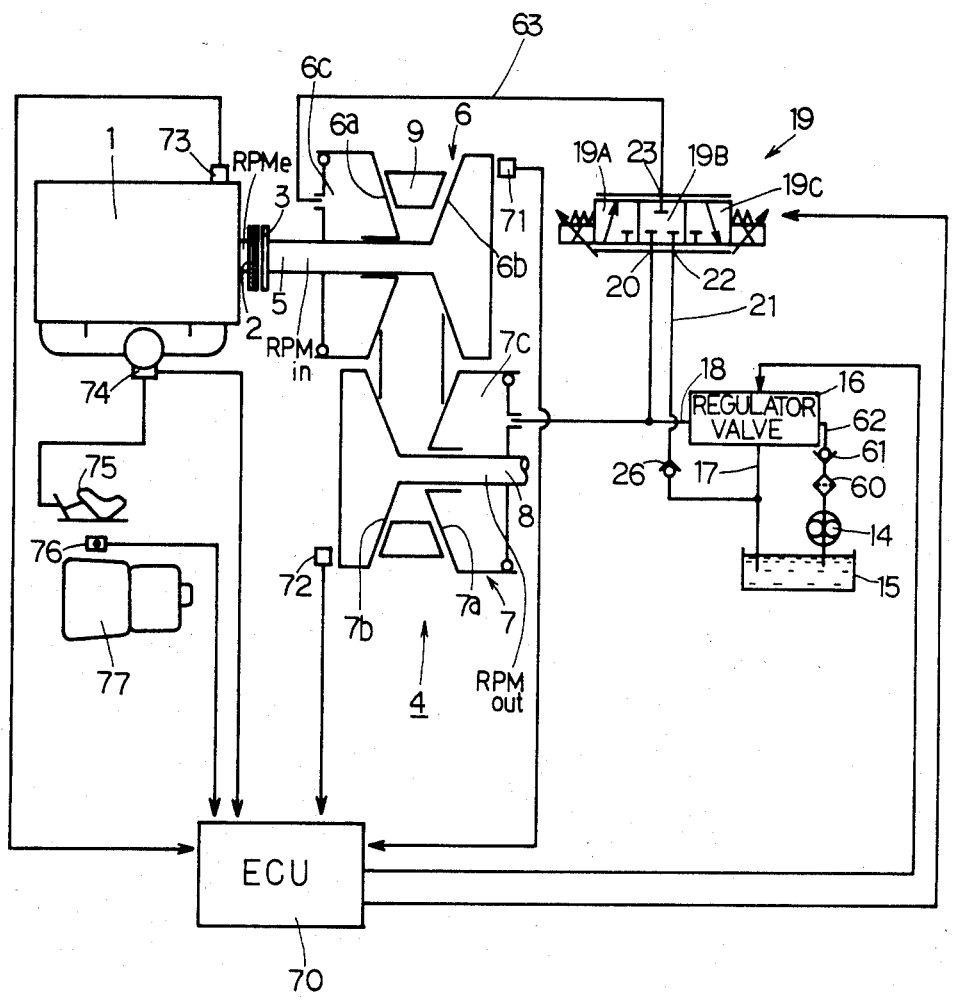
FIG. 1 is a schematic view of the hydraulic apparatus employing the method of the present invention.

FIG. 1 illustrates a schematic view of the hydraulic apparatus employing the method of the present invention. An engine 1 is connected through a crank shaft 2 and a clutch 3 with a shaft 5. The shaft 5 is an input shaft connected with a CVT 4. The CVT 4 comprises a pulley 6 and a pulley 7. The pulley 6 is a driving pulley mounted on a driving and input shaft 5 which is driven by the engine 1. The other pulley 7 is a driven pulley mounted on a driven and output shaft 8. The torque of the shaft 8 is outputted to wheels of a vehicle or the like. A torque transmitting continuous V-belt 9 extends between the pulleys 6 and 7. The driving pulley 6 comprises a movable member 6a, which is axially displaced on and rotates with the input shaft 5, and a member 6b, which is fixed to and rotates with the input shaft 5. The movable member 6a is axially displaced by the pressure exerted upon it by a hydraulic cylinder 6c. When the movable member 6a is axially displaced in a direction toward the opposite member 6b, the width between the members 6a and 6b is decreased. This results in an increase in the effective diameter of the driving pulley 6. As a result, the RPM ratio "e", i.e., (the rotating speed of the driven pulley 7)/(the rotating speed of the driving pulley 6, $RPM_{in}/RPM_{out}$) is increased. The $RPM_{in}$ is governed by the engine speed RPM, represented by $RPM_e$.

Similarly, the driven pulley 7 comprises a movable member 7a, which is axially displaced on and rotates with the output shaft 8, and a non-movable member 7b, which is fixed to and rotates with the output shaft 8. The movable member 7a is axially displaced by the pressure exerted upon it by a hydraulic cylinder 7c. When the movable member 7a is axially displaced in a direction toward the opposite member 7b, the width between the members 7a and 7b is decreased. This results in an increase in the effective diameter of the driven pulley 7.

To minimize the amount of engine power consumed by a hydraulic fluid pump, the hydraulic pressure in the cylinder 7c is controlled to be as small as possible while maintaining a torque necessary to keep the belt from slipping while rotating around the driving pulley 6 and the driven pulley 7. The hydraulic pressure of the cylinder 6c is varied to adjust the ratio. The amount of pressure in the hydraulic cylinder 6c is designed to be smaller than that of the hydraulic pressure in the hydraulic cylinder 7c. However, even though the value of the hydraulic pressure supplied to the hydraulic cylinder 6c is less than the value of the hydraulic pressure supplied to the hydraulic cylinder 7c, the system is designed so that a greater overall hydraulic pressure is realized in the hydraulic cylinder 6c than in the hydraulic cylinder 7c because the area of the cylinder 6c exerted on with the hydraulic pressure is bigger than that of the cylinder 7c. Hence, it is possible to obtain a RPM ratio of more than or at least equal to one. The CVT 4 is supplied with hydraulic fluid by using the following procedure:

A hydraulic fluid pump 14, driven by a motor, pumps hydraulic fluid from a reservoir 15, through a filter 60 and a check valve 61, into a passage 62. The check valve 61 only allows hydraulic fluid to flow in a single direction, from the filter 60 and into the passage 62. A regulator valve 16 controls the pressure supplied to a passage 18 by adjusting an amount of fluid drained from the system, thereby generating a specific line pressure in the passage 18. The regulator valve 16 supplies the line pressure through the passage 18 to the hydraulic cylinder 7c of the driven pulley 7 and to a flow control valve 19. The flow control valve 19 is a three port connection valve, and includes an inlet port 20 communicated with the passage 18, a drain port 22 communicated with a drain passage 21 and an outlet port 23 communicated through a passage 63 with the hydraulic cylinder 6c of the driving pulley 6. When the flow control valve 19 is in a first position 19A, the inlet port 20 communicates with the outlet port 23. When the flow control valve 19 is in a second position, shown by 19B, there is no communication between the three ports 20, 22 and 23. Finally, when the flow control valve 19 is in a third position 19C, the outlet port 23 communicates with the drain port 22 (these different communications among the various ports are more specifically shown in FIG. 2). A check valve 26 is provided on the drain passage 21. The check valve 26 only allows hydraulic fluid to flow in a single direction, from the flow control valve 19 to the hydraulic fluid reservoir 15.

A sensor 71 detects the rotating speed ($RPM_{in}$) of the driving pulley 6. A sensor 72 detects the rotating speed ($RPM_{out}$) of the driven pulley 7. A coolant temperature sensor 73 is mounted adjacent a cylinder block of the engine 1 and detects the temperature of the engine coolant. A throttle opening sensor 74 detects an amount of the throttle opening varied in proportion to the displacement of an accelerator pedal 75. A sensor 76, mounted near a passenger seat 77, detects the position of a shift lever of the transmission. The signals detected by the foregoing sensors are inputted to an electronic control unit (hereinafter referred to as ECU) 70. The ECU 70 outputs a control signal to the regulator valve 16 and the control valve 19.

Figure 2:
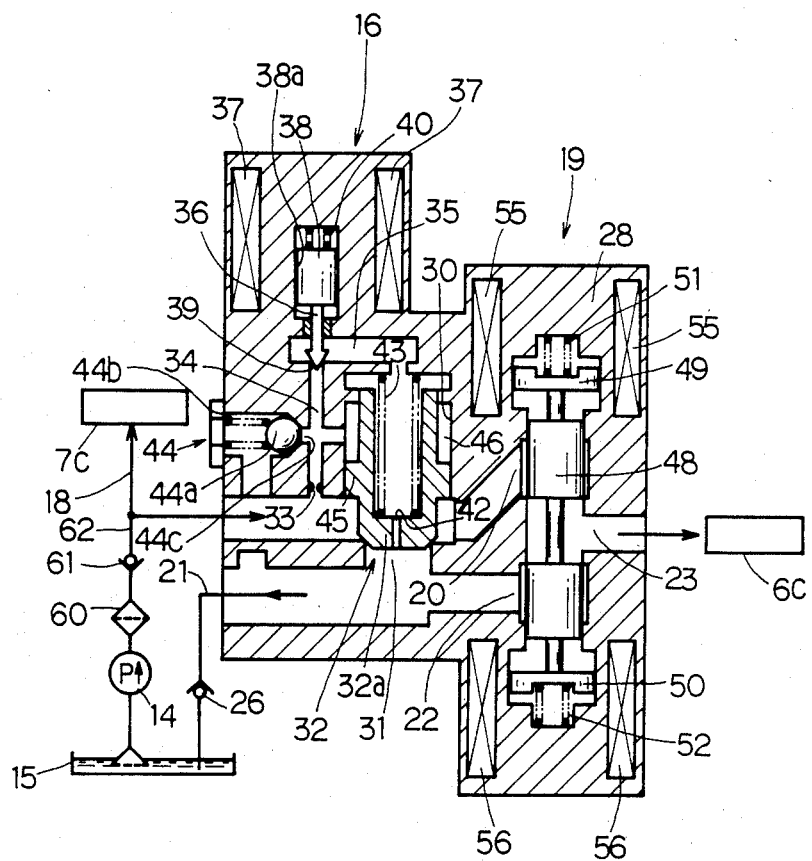
FIG. 2 is an enlarged and detailed view of the hydraulic apparatus employed in the present invention.

FIG. 2 shows a detailed construction of the regulator valve 16 and the flow control valve 19. In this embodiment, both valves 16 and 19 are provided in the same valve body 28. The regulator valve 16 comprises a valve spool 32, a puppet shaped valve member 36 and a relief valve 44. The valve spool 32 slides in a bore 30, thereby opening or closing a port 31 defined between the passage 18 and the drain passage 21. The valve spool 32 comprises a radially extending portion 45 and a head portion 32a. The head portion 32a has a small hole 42 therein. A chamber 46 is provided and defined between the radially extending portion 45 and an inner wall of the valve body. A compression coil spring 43 is located between the head portion 32a of the valve spool 32 and an inner wall of the valve body. The spring 43 biases the valve spool 32 in a direction which tends to close the port 31. The puppet shaped valve member 36 controls the flow of hydraulic fluid at a port 39 which connects a passage 34 with an oil chamber 35. A plunger 38 is fixed to the member 36, and slides in a bore 38a. A compression coil spring 40 is provided between the plunger 38 and an inner wall of the valve body. The spring 40 biases the valve member 36 in a manner which closes the port 39. A first solenoid 37 is positioned around the plunger 38 in the valve body 28 and functionally pulls the plunger 38 against the biasing force of the spring 40, whenever the solenoid 37 is actuated.

An orifice 33 is provided in the passage 34, which communicates with the passage 18. A relief valve 44 is also provided in the passage 34 and comprises a check ball 44a and a spring 44b, which biases the ball 44a in a direction which tends to close a port 44c. When the pressure in the chamber 46 exceeds a predetermined value, the ball 44a is displaced against the force of the spring 44b. In this condition, the oil in the passage 34 returns through the port 44c to the passage 18.

The flow control valve 19 is provided in a position between the regulator valve 16 and the cylinder 6c of the driving pulley. The valve 19 comprises a valve spool 48, plungers 49 and 50, a second solenoid 55 and a third solenoid 56. The valve spool 48 controls the communication between the ports 20, 22 and 23. The plungers 49 and 50 are fixed to each end of the spool 48, respectively. A compression spring 51 biases the plunger 49 in a direction which tends to open the drain port 22. Another compression spring 52, is provided in a position opposite to that of the spring 51 and biases the plunger 50 in a direction which tends to close the drain port 22. Further, the second solenoid 55 is provided around the plunger 49 in the valve body 28. When the second solenoid 55 is actuated, the solenoid 55 pulls the plunger 49 by electromagnetic force against the biasing force of the spring 51. The third solenoid 56 is provided around the plunger 50 in the valve body 28. When the solenoid 56 is actuated, the solenoid 56 pulls the plunger 50 by electromagnetic force against the biasing force of the spring 52.

Once the engine is started and the system is placed in operation, the hydraulic fluid pump 14 pumps the fluid in the reservoir 15 through the filter 60 and the check valve 61 and into the passage 62. When the electric current inputted to the first solenoid 37 increases, the solenoid 37 pulls the plunger 38 against the biasing force of the spring 40. Consequently, the pointed end of the valve member 36 lifts up, and the opening area of the port 39 increases. Because the chamber 35 is communicated by the small hole 42 with the drain passage 21, the volume of the fluid drained increases when the opening area of the port 39 increases. In this condition, the hydraulic pressure in the chamber 46 decreases. When the force biasing the valve spool 32 toward the closing of the port 31, becomes less than the force biasing the valve spool 32 in the opposite direction, then the valve spool 32 is displaced away from the port 31, thereby opening it up. Hence, the line pressure in the passage 18 decreases.

When electric current actuates both the second and third solenoids 55 and 56, the valve spool 48 of the flow control valve 19 is neutrally positioned, as shown in FIG. 2, and corresponds to the second position 19B, as shown in FIG. 1.

In this condition, there is not any flow communication between the ports 20, 22 and 23.

When only the second solenoid 55 is actuated by an electric current, the solenoid 55 pulls the plunger 49 against the biasing force of the spring 51. Hence, the opening defined between the inlet port 20 and the outlet port 23 is increased, which results in an increase in the volume of hydraulic fluid supplied to the cylinder 6c of the driving pulley 6, which causes an increase in the ratio between the driving and driven pulleys.

When only the third solenoid 56 is actuated by an electric current, the solenoid 56 pulls the plunger 50 against the biasing force of the spring 52. Hence, the opening defined between the drain port 22 and the outlet port 23 is increased, which results in an increase in the volume of hydraulic fluid drained from the cylinder 6c of the driving pulley 6, which causes a decrease in the transmission ratio between the driving and driven pulleys.

Thus, the RPM ratios between the driving and driven pulleys are controlled by varying the amount of hydraulic fluid supplied to or drained from the hydraulic cylinder 6c of the driving pulley 6.

Figure 3:
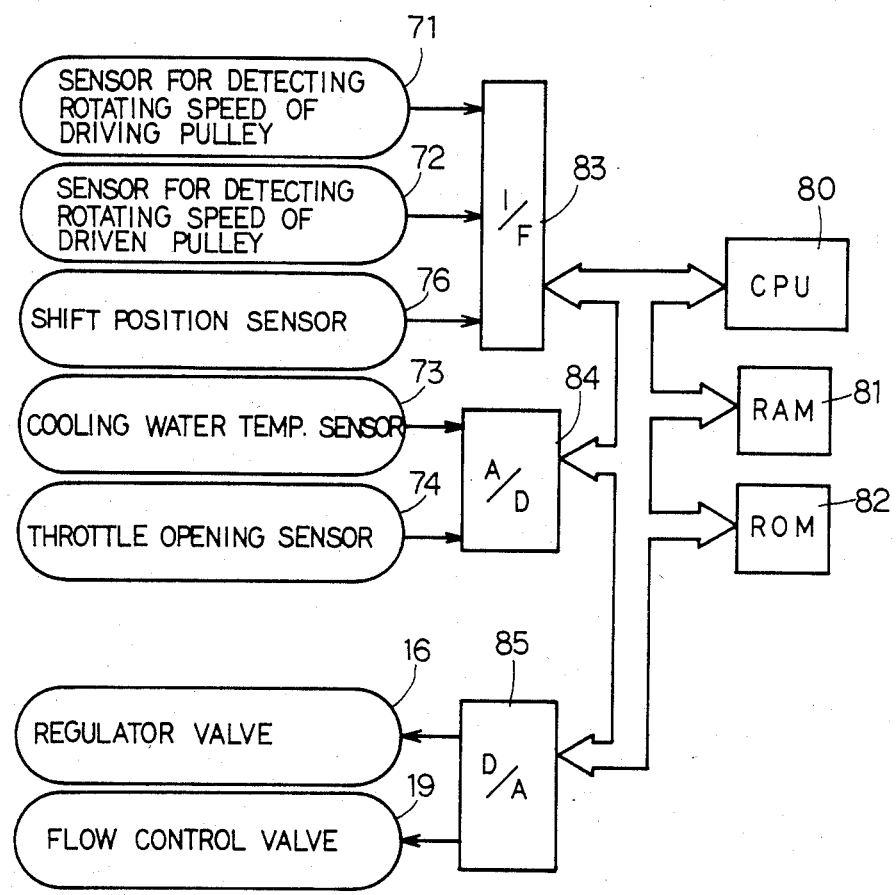
FIG. 3 is a circuit diagram of the electronic control unit employed in the present invention.

The ECU 70 controls the regulator valve 16 and the flow control valve 19 in accordance with the signals detected by the various sensors. FIG. 3 shows that the ECU 70 functions as a digital computer and comprises a central processing unit (hereinafter referred to as CPU) 80 which carries out arithmetic and logic processing functions, an inter-face (hereinafter referred to as I/F) 83, an analog-digital converter (hereinafter referred to as A/D) 84, a random-access memory 81 (hereinafter referred to as RAM) 81 which temporarily stores the calculated data of the CPU 80, a read-only memory (hereinafter referred to as ROM) 82 which stores a predetermined control program and arithmetic constants therein and a digital-analog converter (hereinafter referred to as D/A) 85. An example of how the ECU 70 functions is given by the following manner: The I/F 83 receives an output signal from the sensor 71 corresponding to the rotation of the driving pulley 6 ($RPM_{in}$), an output signal from the sensor 72 corresponding to the rotation of the driven pulley 7 ($RPM_{out}$) and an output from the shift position sensor 76. The A/D 84 receives output signals from the coolant temperature sensor 73 and the throttle opening sensor 74. The CPU 80, a microprocessor, then compares the outputs received against any stored information and issues an output to the D/A 85 which subsequently outputs any appropriate instructions to the regulator valve 16 and the flow control valve 19.

The ROM memory means 82 works in conjunction with the CPU data processing means 80 in the following manner: The ROM 82 stores a data map which includes the desired engine speed in a transient shifting condition, as shown in FIG. 5, and data relating to the amount of throttle opening. The CPU data processing means 80 compares the actual operating conditions to the data stored in the ROM 82, and if appropriate, outputs a signal which results in the regulator valve 16 and the flow control valve 19 being controlled.

Figure 4:
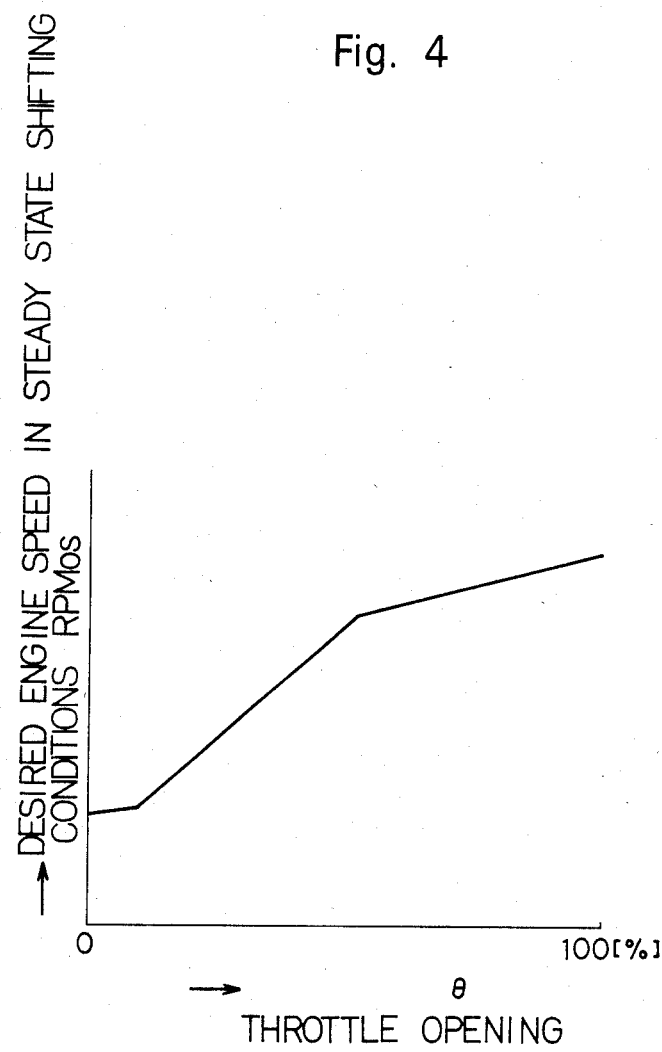
FIG. 4 is a graph showing the relation between the desired engine speed in the steady-state shifting condition and the throttle opening.

FIG. 4 illustrates a graph showing the relationship between the desired engine speed ($RPM_{os}$) in a steady driving state and the amount of throttle opening ($\theta$). The desired engine speed ($RPM_{os}$) is selected so that the amount of fuel consumed is a minimum.

Figure 5A:
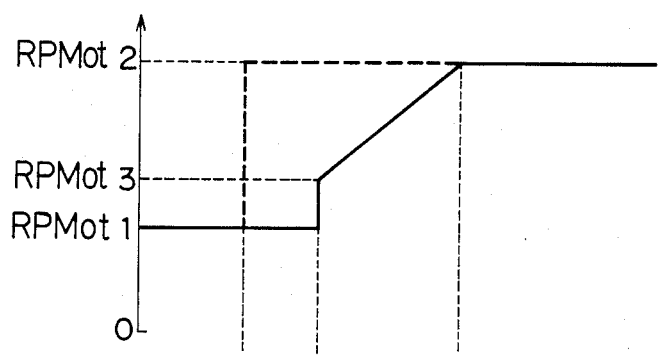
FIGS. 5(a) and 5(b) are graphs showing the relation between the desired engine speed in the transient shifting condition and the throttle opening according to the lapse of the time at the acceleration stage.
Figure 5B:
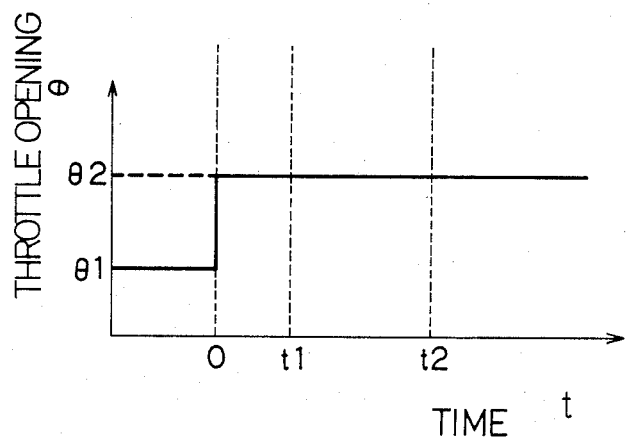

FIG. 5(a) illustrates a graph showing the relationship between a desired engine speed ($RPM_{ot}$) in a transient shifting condition of the engine and a time "t" occurring during the acceleration stage. Fig. 5(b) illustrates a graph showing the relationship between the amount of throttle opening and a time "t" occurring during the acceleration stage. The throttle opening ($\theta$) increases from a value $\theta_1$ to a value $\theta_2$ when the time equals zero. The ECU 70 compares the engine speed $RPM_{ot1}$, which corresponds to a throttle opening of $\theta_1$, with the engine speed $RPM_{ot2}$, which corresponds to a throttle opening $\theta_2$. If the results of the comparison are within the scope defined by following equation:

$$|RPM_{os} - RPM_{ot}| \geq \Delta RPM_a \qquad (1)$$

where, $\Delta RPM_a$ is a constant and the magnitude of the difference between $RPM_{os}$ and $RPM_{ot}$ is compared to $\Delta RPM_a$. Then the desired engine speed in a transient acceleration shifting condition ($RPM_{ot}$) varies as indicated by the solid line shown in FIG. 5(a). This invention is further discussed below.

$$0 \leq t < t_1 \qquad (a)$$

When the time "t" is the value somewhere between t=0 and t<t_1, i.e., $0 \leq t < t_1$, then the desired engine speed during the transient acceleration shifting condition ($RPM_{ot}$) is maintained at a value of $RPM_{ot1}$. For example, "$t_1$" is a value somewhere between 0.2 seconds or 0.3 seconds.

$$t = t_1 \qquad (b)$$

When the time "t" is described by $t=t_1$, the desired engine speed during the transient acceleration shifting condition ($RPM_{ot}$), changes until it is equal to an intermediate value ($RPM_{ot3}$). The $RPM_{ot3}$ is determined by the following equation:

$$RPM_{ot3} = RPM_{ot1} + B(RPM_{ot2} - RPM_{ot1})$$

where, B equals a constant; $0 < B < 1$.
Hence, the following inquality occurs:

$$RPM_{ot1} < RPM_{ot3} < RPM_{ot2}$$

$$t_1 < t < t_2 \qquad (c)$$

When the time "t" continues to run from $t_1$ to $t_2$, the desired engine speed during the transient acceleration shifting condition ($RPM_{ot}$) gradually approaches the value of $RPM_{ot2}$.

In this condition, $$RPM_{ot} = RPM'_{ot} + C_1(RPM_{os} - RPM'_{ot}) + C_2 \qquad (2)$$

where; $RPM'_{ot}$ corresponds to a previously calculated $RPM_{ot}$, which is reinserted into equation (2) so that a progressive change in engine speed can be realized. Equation (2) results in a different engine speed approximately every 10 milliseconds; $RPM_{os}$ is the desired engine speed at steady state conditions when the throttle opening is defined by $\theta_1$; $C_1$ and $C_2$ are constants. Note that when the time "t" is equal to $t_1$, $RPM_{ot}$ increases to $RPM_{ot3}$ and when the time "t" is equal to $t_2$, $RPM_{ot}$ increases to $RPM_{ot2}$.

The ECU 70 determines whether the operator depresses the accelerator pedal and therefore requires an increase in the engine RPM during a time between t=0 and t=t$_1$. If the operator does not displace the accelerator pedal 75 during the time between t=0 and t=t$_1$, the ECU 70 does not increase the engine speed (RPM$_e$) and stops any increase in the engine speed (RPM$_e$).

However, if the results of the comparison made by the ECU 70 are not within the scope of equation (1), but are within the scope of the following equation (3), then the desired engine speed in a transient shifting condition (RPM$_{ot}$) is increased in accordance with equation (4).

$$|RPM_{os}-RPM_{ot}|<\Delta RPM_a \quad (3)$$

$$RPM_{ot}=RPM'_{ot}+D_1(RPM_{os}-RPM'_{ot})\pm D_2 \quad (4)$$

Where; RPM$'_{ot}$ corresponds to a previously calculated RPM$'_{ot}$, which is reinserted into equation (4) so that a progressive change in engine speed can be realized. Equation (4) results in a different engine speed approximately every 10 milliseconds; RPM$_{os}$ is the desired engine speed at steady state conditions when the present throttle opening is defined by $\theta_1$; D$_1$ and D$_2$ are constants; and part of the right side of equation (4) is defined by equation (5):

$$D_1(RPM_{os}-RPM'_{ot})\pm D_2=(RPM_{os}-RPM'_{ot})/100 \quad (5)$$

D$_1$ and D$_2$ are determined so that the RPM$_{ot}$ on the left side of equation (4) can be gradually varied.

Figure 6:
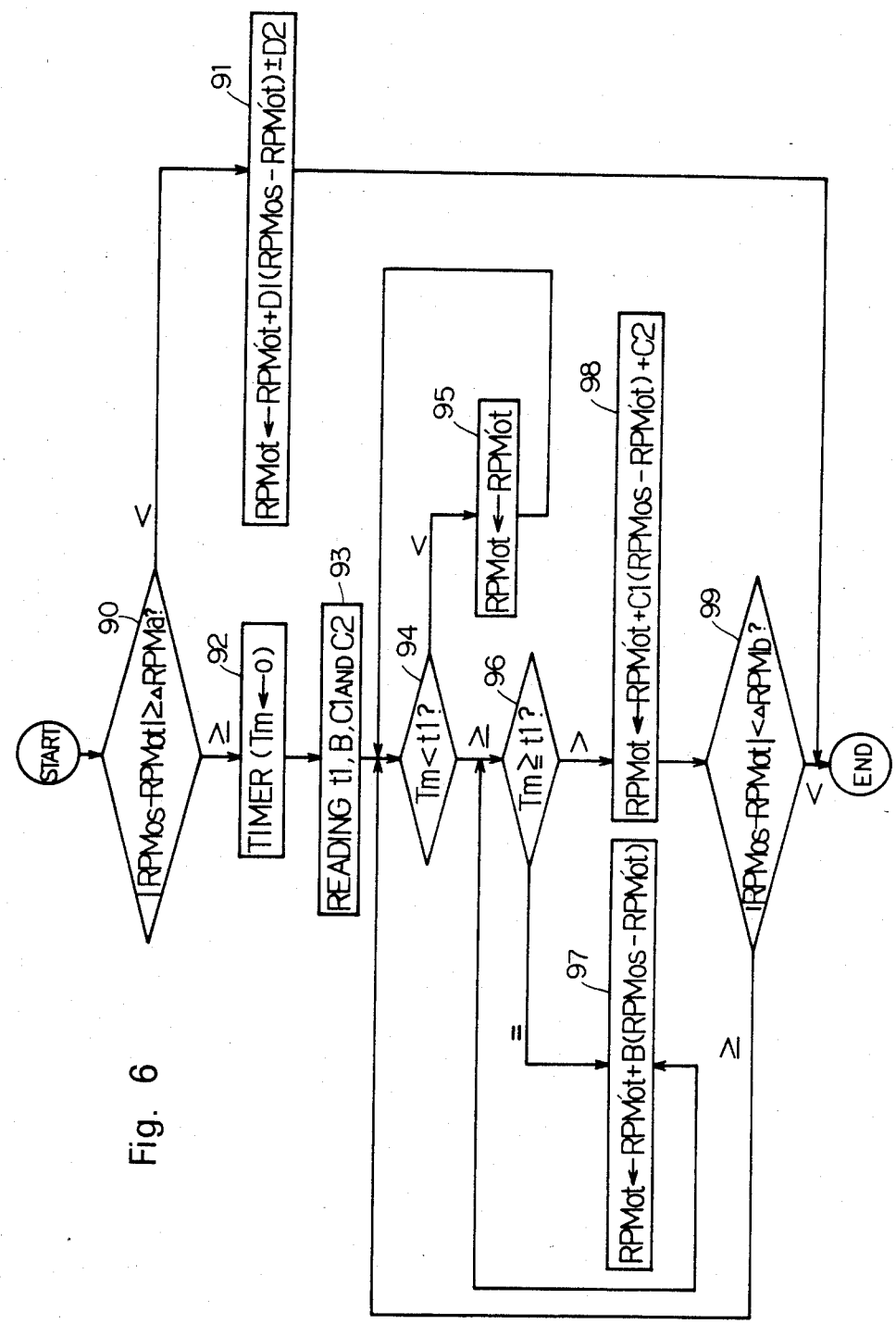
FIG. 6 is a flow chart illustrating operations according to the present invention.

FIG. 6 shows a flow chart illustrating the operation of the program according to the present invention. This program is an interruption program which is performed after a prescribed timing signal is issued. The ECU 70 commences the operation when the vehicle's main power switch is turned on. The first step 90 determines whether $|RPM_{os}-RPM_{ot}|$ is greater than or equal to $\Delta RPM_a$. If $|RPM_{os}-RPM_{ot}|$ is greater than or equal to $\Delta RPM_a$, the program proceeds to step 92. If $|RPM_{os}-RPM_{ot}|$ is less than $\Delta RPM_a$, the program proceeds to step 91. In step 91, the desired engine speed during a transient shifting condition (RPM$_{ot}$) is calculated by the equation (4):

$$RPM_{ot}=RPM'_{ot}+D_1(RPM_{os}-RPM'_{ot})\pm D_2.$$

If the program proceeded to step 92, a timer "Tm" is set to be zero. The timer "Tm" counts a clock pulse. The program then proceeds to step 93. In step 93, the ECU 70 reads the values, t$_1$, B, C$_1$ and C$_2$. Step 94 then determines whether the timer "Tm" is less than t$_1$ or not. If the timer "Tm" is less than t$_1$, then the program proceeds to step 95. In step 95, the desired engine speed RPM$_{ot}$ is maintained when the time "t" is the value somewhere between t=0 and t=t$_1$ and the result is inputted back into step 94. If the timer "Tm" is greater than or equal to t$_1$, then the program proceeds to step 96. If the timer "Tm" is greater than t$_1$, the program proceeds to step 98. If the timer "Tm" is equal to t$_1$, the program proceeds to the step 97. In step 97, the desired engine speed RPM$_{ot}$ is calculated by using the following equation:

$$RPM_{ot}=[RPM'_{ot}+B(RPM_{os}-RPM'_{ot})].$$

The result of step 97 is inputted back into step 96. If Tm is greater than t$_1$, the program proceeds to step 98 where the desired engine speed during a transient condition (RPM$_{ot}$) is calculated by using the following equation:

$$RPM_{ot}=[RPM'_{ot}+C_1(RPM_{os}-RPM'_{ot})+C_2].$$

The program then proceeds to step 99 which uses the following equation which questions the validity of the relationship:

$$|RPM_{os}-RPM_{ot}|<\Delta RPM_b \quad (6)$$

Where; RPM$_{os}$ is the desired engine speed in a steady state condition when the present throttle opening is equal to $\theta$; RPM$'_{ot}$ is the desired engine speed resulting from the previous calculation; in step 98; and $\Delta RPM_b$ is a constant. If $|RPM_{os}-RPM_{ot}|$ is greater than or equal to $\Delta RPM_b$, then the program returns to step 94.

Figure 7A:
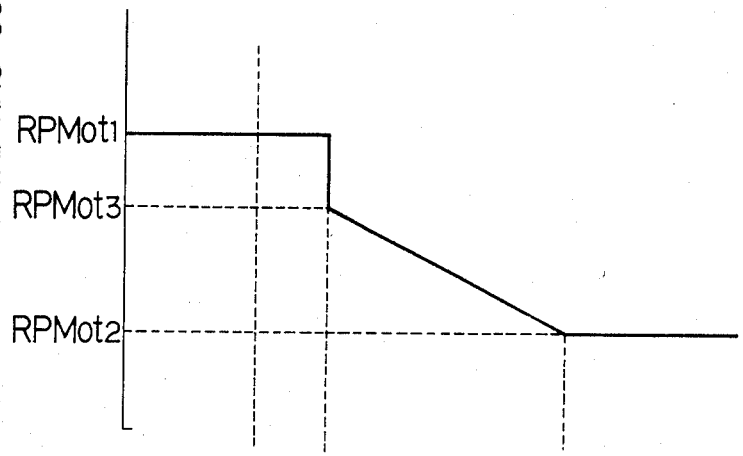
FIGS. 7(a) and 7(b) are graphs showing the relation between the desired engine speed in the transient shifting condition and the throttle opening according to the lapse of the time at the deceleration stage.
Figure 7B:
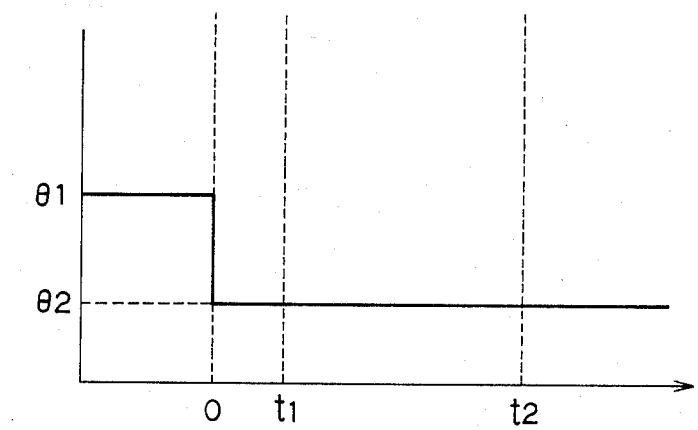

FIG. 7(a) illustrates a graph showing the relationship between the desired engine speed during a transient deceleration shifting condition (RPM$_{ot}$) and a time "t". FIG. 7(b) illustrates a graph showing the relationship between an amount of throttle opening ($\theta$) and the time "t". The throttle opening "$\theta$" decreases from a value $\theta_1$ to a value $\theta_2$ with t=0. The ECU 70 compares the engine speed RPM$_{ot1}$, which corresponds to the throttle opening $\theta_1$, with the engine speed RPM$_{ot2}$, which corresponds to the throttle opening $\theta_2$. If the results of the comparison are within the scope defined by the same equation (1), $$|RPM_{os}-RPM_{ot}|\geq\Delta RPM_a \quad (1)$$

then the desired engine speed during a transient deceleration shifting condition (RPM$_{ot}$) varies as indicated by the solid line shown in FIG. 7(a). This variation is further discussed below:

$$0\leq t<t_1 \quad (a)$$

When the time "t" is a value somewhere between t=0, and t=t$_1$, i.e., $0\leq t<t_1$, then the desired engine speed during the transient deceleration shifting condition (RPM$_{ot}$) is maintained at a value of RPM$_{ot1}$.

$$t=t_1 \quad (b)$$

When the time "t" is described by t=t$_1$, the desired engine speed during the transient deceleration shifting condition (RPM$_{ot}$) changes until it is equal to an intermediate value (RPM$_{ot3}$). The RPM$_{ot3}$ is determined by the following equation:

$$RPM_{ot3}=RPM_{ot1}-B(RPM_{ot1}-RPM_{ot2})$$

where, B equals a constant, 0<B<1.

Hence, the following inequality occurs:

$$RPM_{ot1}<RPM_{ot3}<RPM_{ot2}$$

$$t_1<t<t_2 \quad (c)$$

When the time "t" continues to run from t$_1$ to t$_2$, the desired engine speed during the transient deceleration shifting condition (RPM$_{ot}$) gradually approaches the value of RPM$_{ot2}$.

In this condition, $$RPM_{ot}=RPM'_{ot}-E_1(RPM'_{ot}-RPM_{os})-E_2 \quad (7)$$

where RPM$'_{ot}$ corresponds to a previously calculated RPM$_{ot}$, which is reinserted into equation (7) so that a progressive change in engine speed can be realized. Equation (7) results in a different engine speed approximately every 10 millisecond; $RPM_{os}$ is the desired engine speed at steady state conditions when the throttle opening is defined by $\theta_1$; and $E_1$ and $E_2$ are constants.

When the time "t" is equal to $t_1$, $RPM_{ot}$ is equal to $RPM_{ot3}$. When the time "t" is equal to $t_2$, $RPM_{ot}$ is approximately equal to $RPM_{ot2}$.

In accordance with the aforementioned embodiment, the engine speed ($RPM_e$) is utilized as a parameter of the program. When the transmission ratios between the driving pulley and the driven pulley are employed, the transmission ratio is defined by the following equations:

$$e_{os} = RPM_{out}/RPM_{os}$$

where, $e_{os}$ is the desired transmission ratio in a steady state condition; and, $$e_{ot} = RPM_{out}/RPM_{os}$$

where, $e_{ot}$ is the desired transmission ratio in a transient shifting condition.

The actual transmission ratio "e" is calculated by the ratio ($RPM_{out}/RPM_{in}$).

While the present invention has been described in its preferred embodiments, it is to be understood that the invention is not limited thereto, and may be otherwise embodied within the scope of the following claims.

What is claimed is:

1. A method for controlling the RPM of an engine in a motor vehicle using a continuously variable transmission, the transmission having a driving pulley comprising a fixed member and a movable member, the movable member being actuated by a hydraulic cylinder to form a V-shaped opening between the movable member and the fixed member, a driven pulley with another fixed member and another movable member, the another movable member being similarly actuated by another hydraulic cylinder to form a similar V-shaped opening between the another movable member and the another fixed member, and a flexible belt member spanning the pulleys so that the diameter of the pulleys can be varied with regard to each other so that different transmitting ratios can be obtained, the method comprising the steps of:
   detecting a change in an amount of throttle opening in a throttle means on the engine;
   detecting an actual RPM of the engine at a point immediately after a change occurs in the amount of throttle opening in the throttle means:
   selecting an intermediate engine RPM and changing the detected actual RPM to the selected intermediate RPM when the continuously variable transmission undergoes a transient shifting condition, the transient shifting condition being generated by the change in the amount of throttle opening, the selected engine RPM being intermediate in value between an engine RPM which would occur under steady state conditions given the amount of throttle opening and the detected actual RPM; and
   gradually changing the selected intermediate engine RPM to the steady RPM corresponding to the amount of throttle opening.

2. The method of claim 1, wherein the method further comprises:
   maintaining the actual engine RPM at a constant value for a predetermined amount of time, after the change occurs in the amount of throttle opening in the throttle means.

3. A method for controlling the RPM of an engine in a motor vehicle using a continuously variable transmission, the transmission having a driving pulley comprising a fixed member and a movable member, the movable member being actuated by a hydraulic cylinder to form a V-shaped opening between the movable member and the fixed member, a driven pulley with another fixed member and another movable member, the another movable member being similarly actuated by another hydraulic cylinder to form a similar V-shaped opening between the another movable member and the another fixed member, and a flexible belt member spanning the pulleys so that the diameter of the pulleys can be varied with regard to each other so that different transmission ratios can be obtained, the method comprising the steps of:
   detecting a change in an amount of throttle opening in a throttle means on the engine;
   determining a steady state RPM corresponding to the amount of throttle opening;
   detecting an actual RPM of the engine at a point immediately after a change occurs in the amount of throttle opening in the throttle means;
   calculating the magnitude of the difference between the steady state RPM and the detected actual RPM.

4. The method of claim 1, wherein the method further comprises:
   changing the actual RPM of the engine occurring immediately after the change in amount of throttle opening to an intermediate RPM which is between the steady state RPM and the actual RPM, the change in RPM occurring after a predetermined lapse of time, whenever the magnitude of the difference between the actual RPM and the steady state RPM exceeds a predetermined value.

5. The method of claim 4, wherein the method further comprises:
   gradually changing the value of the engine RPM to the steady state RPM after the actual engine RPM has changed to the intermediate RPM.

6. The method of claim 3, wherein the intermediate engine RPM changes linearly from the intermediate RPM to the steady state RPM.

7. The method of claim 5, wherein the method further comprises:
   maintaining the actual engine RPM at a constant value for a predetermined amount of time, after a change occurs in the amount of throttle opening in a throttle means.

8. The method of claim 2, wherein the method further comprises:
   maintaining the actual engine RPM at a constant value for a predetermined amount of time, after the change occurs in the amount of throttle opening in the throttle means.

9. The method of claim 2, wherein the method further comprises:
   changing the actual engine RPM to a previously calculated and objective engine speed when the magnitude of the difference between the steady state RPM and the detected actual RPM does not exceed a predetermined value.

10. A method for controlling an actual engine speed in a motor vehicle comprising a continuously variable transmission, the transmission having a driving pulley comprising a fixed member and a movable member, the movable member being actuated by a hydraulic cylinder to form a V-shaped opening between the movable member and the fixed member, a driven pulley with another fixed member and another movable member, the another movable member being actuated by another hydraulic cylinder to form another V-shaped opening between the another movable member and the another fixed member, a flexible belt member spanning the pulleys, and an electronic control means, the electronic control means includes a memory means for storing a relationship between a plurality of desired engine speeds and throttle openings, said electronic control means for controlling pressure in the hydraulic cylinders according to an optimal desired engine speed of the engine, the method comprising the steps of:

- detecting first and second amounts of a throttle opening, the first amount of the throttle opening detected being an initial amount before a change in the throttle opening, the second amount of the throttle opening being an amount after the change in the throttle opening;
- determining a first desired engine speed for steady state conditions before said change in the throttle opening and determining a second desired engine speed for steady state conditions after said change in the throttle opening, said first desired engine speed being determined from said detected first amount of said throttle opening in accordance with said relationship stored in said memory means, said second desired engine speed being determined from the detected second amount of said throttle opening in accordance with said relationship stored in said memory means;
- calculating a difference between said first desired engine speed and said second desired engine speed;
- comparing said difference between said first desired engine speed and said second desired engine speed with a predetermined value;
- adjusting said actual engine speed in accordance with said comparison, whereby when said difference is smaller than said predetermined value, said actual engine speed is adjusted to approach said second desired engine speed gradually, and when said difference is larger than said predetermined value, said actual engine speed is immediately adjusted to a transient value and then is adjusted to approach said second desired engine speed gradually.

11. The method of claim 10, wherein the second desired engine speed is substantially similar to the first desired engine speed, when said difference is smaller than said predetermined value.

12. The method of claim 11, wherein said transient value is larger than said first desired engine speed and is smaller than said second desired engine speed.

13. The method of claim 12, wherein said transient value equals approximately one-third of the difference between the first desired engine speed and the second desired engine speed plus the value of the first desired engine speed.

14. The method of claim 13, wherein said adjustment is delayed for a predetermined period of time after said change in said throttle opening.

15. The method of claim 13, wherein said adjustment from actual engine speed to said second desired engine speed from said transient value is linear.

16. The method of claim 13, further comprising the step of maintaining the actual engine speed at the first desired engine speed for a predetermined period of time after the change in the throttle opening.

* * * * *